Sept. 28, 1937.  G. A. LYON  2,094,327
SPARE TIRE COVER
Filed Aug. 21, 1933  2 Sheets-Sheet 1
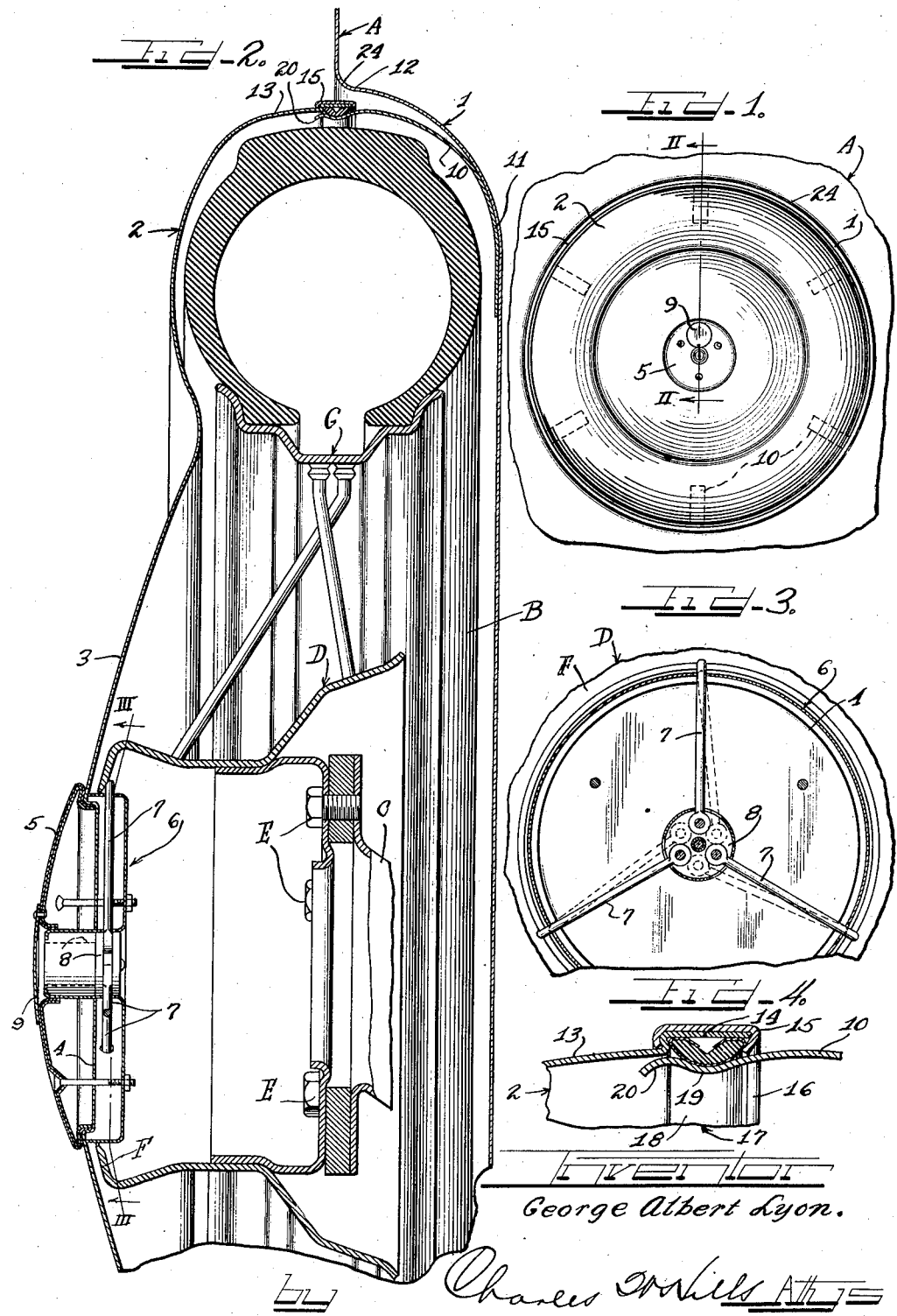
George Albert Lyon.

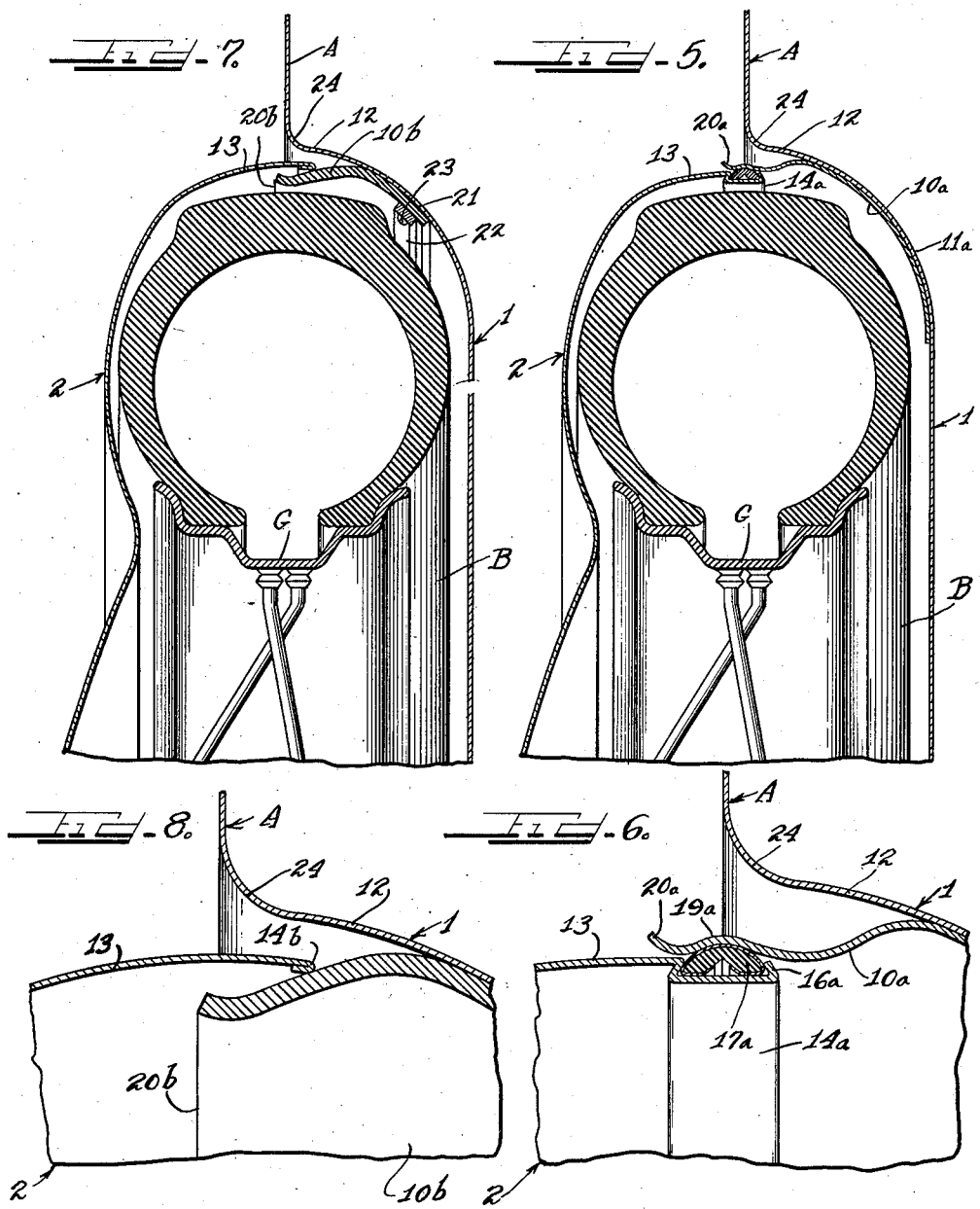

Patented Sept. 28, 1937

2,094,327

UNITED STATES PATENT OFFICE 2,094,327

SPARE TIRE COVER

George Albert Lyon, Detroit, Mich., assignor to Lyon Incorporated, Detroit, Mich., a corporation of Delaware Application August 21, 1933, Serial No. 686,030

2 Claims. (Cl. 296—37)

This invention has to do with tire covers and is concerned more particularly with a tire cover to be mounted on the hub of a spare wheel.

It is an object of the invention to provide a disc or drum-like tire cover for disposition over the exposed portion of a spare wheel and tire and incorporating means whereby the same may be mounted on the hub of the wheel.

It is another object of the invention to provide an automobile body with a depression for receiving the rear side wall and substantially one-half of the tread of a spare tire, in combination with a removable tire cover structure for substantially covering the remaining tread and side wall portions and the outer side of the spare wheel.

It is a further object of the invention to provide a cover for enclosing substantially the entire spare wheel and tire mounted thereon, of such character that a part of the cover may be readily removed to enable the tire and wheel also to be removed.

It is a still further object of the invention to provide a combined tire cover and hub cap structure embodying means whereby the tire cover may be releasably mounted through its hub cap structure on the spare wheel hub.

It is a further object of the invention to provide an automobile body with a depression or cavity formed with means for receiving and supporting a spare wheel carrying a spare tire, the cavity being of such proportions as to receive a cover for the remaining exposed portions of the spare wheel and tire, in such a manner as to assist in holding the cover structure in place against rattling.

It is another object of the invention to provide a member for covering substantially one-half of a spare wheel and tire for cooperation with an automobile body provided with a cavity for receiving the other half of the spare wheel and tire, and resilient cushioning means cooperating with the two cover portions to guide the cover structures into telescoping relationship and to center the parts and to hold the same against rattling.

In accordance with the general features of the invention, the automobile body is formed with a substantially circular depression in any part thereof, such as a side or at the rear, extending at any desired angle, whether vertical, horizontal or inclined, and of a shape to telescopically receive the rear side and substantially one-half, transversely, of a spare wheel and tire. A disc-like or drum-like separable tire cover member is formed for enclosing the remaining portions of the tire and wheel, and embodies key-controlled lock means cooperating with the hub of the spare tire to releasably lock the second cover member in position. So locked, the cover member cooperates with the depressed portion of the automobile to substantially entirely enclose the spare wheel and tire. Resilient means cooperate with the portions of the cover to assist in guiding the separable member into position relative to the depressed portion and to properly center the parts relative to each other and to prevent rattling therebetween.

The releasable tire cover and associated parts are, for the most part, preferably made of form-retaining sheet material of any desired character, sheet metal being preferable, however.

Further objects and advantages of the invention will appear as the description proceeds.

This invention (in preferred forms) is illustrated in the drawings and hereinafter more fully described.

Figure 1 is a fragmentary elevational view of a tire cover structure in proper tire protecting position in cooperation with an automobile body.

Figure 2 is an enlarged fragmentary sectional view taken substantially in the plane designated by the line II—II in Figure 1, certain parts for convenience being shown in elevation.

Figure 3 is a fragmentary sectional view taken substantially as indicated by the line III—III.

Figure 4 is an enlarged fragmentary sectional view of the details of the anti-rattling means appearing in the upper part of Figure 2.

Figure 5 is a view similar to the upper part of Figure 2 but shows a modified form of the invention.

Figure 6 is an enlarged fragmentary sectional view of the anti-rattling details appearing in the upper part of Figure 5.

Figure 7 is a view similar to Figure 5 but showing a further modified form of the invention.

Figure 8 is an enlarged fragmentary sectional view of the centering details of the form of the invention shown in Figure 7.

An automobile body, fragmentarily shown at A, is formed with a preferably though not necessarily circular depression 1 of substantially greater circumference than the circumference of the spare tire B and is provided preferably permanently therein with a spare wheel carrier C having a mounting portion substantially centered relative to the depression and to which the hub D is releasably bolted at E, the bolts being accessible through the opening in the outer side F of the hub. The depression 1 is of such depth as preferably to receive substantially one half of the tread of the tire and substantially the entire rear side wall of the tire and the corresponding portions of the spare wheel. Sufficient clearance is provided to enable the depression 1 to accommodate tires of varying widths and diameters.

To the end that the remaining portions of the tire and wheel may be covered, the invention consists in the provision of a disc-like half cover member 2 of a shape substantially conforming to the outer portion of the tread, the outer side wall of the tire, and the outer side of the spare wheel. The cover is accordingly curved rearwardly and inwardly adjacent the bead at the outer side of the tire, and from that point toward the center of the cover the same is bulged forwardly or frontward to be disposed in front of the outer side F of the spare wheel hub at 3. The central portion of the bulge 3 is formed with a substantially circular shallow depression 4 extending rearwardly and providing a socket in which a substantially cylindrical flange of a false hub cap head 5 is received. Secured to the central portion of the cover member 2 in conjunction with the head 5 is a key-controlled lock structure designated generally by the numeral 6 which is described in detail in my copending application Serial No. 686,031, filed August 21, 1933. Briefly, this lock structure includes substantially radially movable latch pins 7 carried by a rotary key-controlled cylinder 8 which projects the pins into and out of locking positions, according as the cylinder is rotated in one direction or the other. The locking means is arranged so that the same may be telescoped with the hub D upon axial movement of the member 2. A swingable closure 9 may be positioned to conceal the locking structure as shown in Figure 2, or may be swung away to disclose the lock cylinder as shown in Figure 1.

In accordance with one form of the invention, the depression 1 is formed with preferably a plurality of spring fingers 10 securely fastened at 11 as by butt welding, riveting or the like. The number of spring fingers 10 may be varied, six being here shown for the purpose of illustration only. The portions of the fingers 10 extending forwardly free of the rim portion 12 of the depression 1 are formed to yield substantially radially and, if desired, to project somewhat beyond the mouth of the cavity as shown. The springs 10 are preferably arranged in a substantially circular and coaxial series with respect to the depression 1 so as to yieldably center and support the cover member 2.

The cover member 2 is formed with a rim portion 13 arranged to extend rearwardly over substantially one-half of the transverse extent of the tread of the tire B, so that its rear margin and the mouth of the depression 1 are disposed in substantially the median plane of the tire when in proper tire protecting position. In fact, the parts 1 and 2 are preferably somewhat overlapped as shown in Figure 2 under such conditions, the depth of the respective members being such that when they cooperate with each other to properly protect the tire, said members are substantially spaced from the tire B.

In the form of the invention shown in Figures 1, 2, and 4, the margin 14 of the cover member 2 is offset outwardly in the form of a semi-dovetail projection for securely supporting a peripheral preferably metallic strip 15, substantially C-shaped in cross section, said strip being dovetailed over the margin 14 as clearly shown in Figures 2 and 4 so as to be substantially permanently connected therewith. The rear flange 16 of the strip 15 cooperates with the forward wall of the margin 14 to provide a substantially complete dove-tailed recess in which is preferably permanently secured a cushion or anti-rattling strip 17. The strip 17 is preferably formed of rubber provided with a sheath 18 of fabric or other suitable material. The strip 17 is normally of greater width than when interlocked with the cover member 2, and is interlocked therewith by virtue of its inherent tendency to expand transversely, that is, straighten out transversely. The strip 17 preferably projects radially inward of the adjacent portions of the cover member 2 and strip 15 and has an interior diameter which is somewhat less than the normal external diameter of the circle containing the kinks or depressions 19 of the springs 10. The strip 17 is curved transversely, and the free ends 20 of the springs 10 are curved downwardly, said curved portions cooperating to produce a cam effect as the strip 17 rides over said free ends while the cover member 2 is being applied to and from cooperative position relative to the depression 1. The depressions 19 of the springs 10 are so formed as to hold the strip 17 against axial movement relative thereto, and when the strip 17 is mounted on the springs 10, the latter are under stress and inherently tend to move outwardly at their free ends, thereby exerting yieldable pressure on the strip 17 so as to yieldably support the cover member 2 in substantially axial relation to the depression 1 and wheel G.

In applying the cover member 2, the centering of the locking instrumentalities relative to the hub D is facilitated since the rim portion 12 of the depression 1 serves as a visible guide as the rim portion 13 of the cover member 2 is moved axially into juxtaposition to the rim portion 12.

The strip 15, if desired, may be formed of stainless steel or may be chrome or otherwise plated to provide an ornamental surface or bead to thereby improve the appearance of the cover structure. The strip 15 may be attached to the margin 14 by a spinning operation during which the flange 16 is formed, and may be formed endless prior to assembly with the cover member 2 as by riveting or spot welding its ends together or connecting them by a separate strap, or the strip 15 may be split and thus fastened to the cover member 2. The strip 15 is preferably secured in such a manner that it will not move relative to the margin 14.

If desired, the margin 14 could be formed in the shape of a dove tail to carry the anti-rattling strip 17, instead of making such structure in two parts as shown in Figures 2 and 4.

A somewhat modified construction is shown in Figures 5 and 6, wherein the cooperating anti-rattling instrumentalities are substantially reversed from those shown in Figures 1, 2 and 4. To this end the margin 14a at the rear of the rim portion 13 of the cover member 2 projects inwardly of the rim portion 13 and is formed transversely as a dove tail, providing an outwardly open dove tail circumferential groove in which a cushion strip 17a is received. The strip 17a is preferably of the same construction as the strip 17. In this form of the invention the strip 17a is convex outwardly and cooperates with the kinks or depressions 19a and rounded free ends 20a of the springs 10a in a manner which will be readily understood upon inspection of Figures 5 and 6 and reviewing the description of Figtires 1 to 4 inclusive. In the construction shown in Figures 5 and 6, it will be evident that the cooperating anti-rattling instrumentalities are so dimensioned that the cover member 2 readily moves the free ends of the springs 10a radially outwardly when the cover member 2 is assembled or disassembled with respect to the depression 1 in the body A, so that when the parts are assembled, the springs 10a exert an inward force upon the strip 17a thereby yieldably supporting and centering the cover member 2. The strip 17a is assembled with the dove tail shaped margin 14a by placing the same about the cylindrical portion of the margin 14a before the flange 16a is formed thereon, and thereafter spinning the flange 16a so as to compress the strip 17a transversely or at least so as to provide a dove tail interlock therebetween.

The strips 17 and 17a may be continuous or discontinuous, as desired, the former being preferable so that no special aligning or registering of the tire cover member 2 with respect to the spring members 10 and 10a is necessary.

A still further modified construction is shown in Figures 7 and 8 in which the anti-rattling means comprises a preferably circular yieldable strip or skirt of any suitable material such as rubber as shown at 10b and is rigidly secured to the outer peripheral wall of the depression 1 at 21 in any suitable way as by steel or other metal strip 22 through the use of studs 23 arranged circumferentially of the strip 22. The rubber or like strip 10b may, if desired, be discontinuous and comprise a plurality of individual elements as is the case with the springs 10 and 10a previously described, in which event of course the strip 22 will preferably also be discontinuous.

The strip 10b projects free forwardly of the depression 1 as shown at 20b to substantially the plane of the body A at the mouth of the depression 1, but inwardly spaced preferably from the forward portion 24 of the rim portion 12 of the depression 1 to provide a circumferential forwardly opening space in which the rear margin 14b of the cover member 2 is received when the cover structure is assembled into proper tire protecting relation. The margin 14b is so dimensioned that when the cover member 2 is interlocked with the hub, said margin 14b exerts inward pressure upon the strip 10b, the latter yielding and affording a resilient support and centering means for the cover member 2 when the cover member 2 is unlocked with respect to the wheel hub.

It will be observed that the rim portion 13 of the cover member 2 extends somewhat into the depression 1 in the vehicle body to cooperate with the same in substantially completely enclosing and concealing the spare tire and wheel on which the same is mounted. Moreover, it will be noted that the outer peripheral portion of the cover member 2 is of curved contour in a transverse direction and generally merges with the un-depressed portion of the vehicle body A to produce a substantially streamline effect to thereby minimize air resistance.

The structure of this tire cover is obviously very simple involving a minimum of parts which may be made at a low cost of manufacture. The parts may be readily stamped out and formed by simple machine operations, and the cover is preferably of such size as to readily accommodate any size tire which may be used with a given automobile. It is also contemplated that the cover structure may be made of one size for all cars. The tire cover 2 may be formed exactly the same for various sizes of tires, wheels, and wheel hubs, and the lock housing may be dimensioned exteriorly to conform with the hub cap structure of the particular car to which the cover member 2 is to be applied and with the particular hub structure to which the same is to be applied.

When the cover is locked to the hub of the wheel, the wheel and tire are locked to the carrier C. This is made possible by virtue of the fact that the mounting bolts E are accessible to release the spare wheel only through the front of the hub, and such access is impossible as long as the cover is locked to the hub. Thus the locking instrumentalities in effect serve to lock the spare wheel, spare tire and cover to the car. The vehicle body is flared at 24 adjacent the rim portion 12 thereof to assist in guiding the cover member 2 into camming cooperation with the yieldable supporting means carried by the depression 1 as the cover member 2 is shoved axially into proper tire protecting position.

The cover member 2 and lock housing parts are preferably formed of sheet metal, although it is to be understood that any other suitable substantially form-retaining material may be employed if desired.

The springs 10a are preferably secured to the depressed portion 1 as by spot welding at 11a, riveting or the like.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination with a vehicle body having a depressed portion therein adapted to have a spare wheel and tire partially disposed therein, a cover member for disposition over the front face of said spare wheel and tire and having an outer marginal edge arranged to extend out over the tread of said tire but in spaced relationship thereto, resilient supporting means extending between said outer marginal edge of said cover member and said vehicle body for resiliently supporting said member in spaced relationship with said tire, and means for restraining axial movement of said member with respect to said wheel.

2. In combination with a vehicle body having a depressed portion therein adapted to have a spare wheel and tire partially disposed therein, a cover member for disposition over the front face of said spare wheel and tire and having an outer marginal edge arranged to extend out over the tread of said tire but in spaced relationship thereto, a plurality of resilient arms mounted on said vehicle body within said depressed portion extending between said outer marginal edge of said cover member and said vehicle body adapted to support said member in spaced relationship with said tire, and means for restraining axial movement of said member with respect to said wheel.

GEORGE ALBERT LYON.